United States Patent [19]

Boyden

[11] Patent Number: 5,130,708

[45] Date of Patent: Jul. 14, 1992

[54] BOAT SINKING WARNING DEVICE

[75] Inventor: Willis G. Boyden, P.O. Box 83533, Los Angeles, Calif. 90083

[73] Assignee: Will Boyden, Inc., Calif.

[21] Appl. No.: 667,217

[22] Filed: Mar. 11, 1991

[51] Int. Cl.$^5$ ............................................. G08B 23/00
[52] U.S. Cl. ................................. 340/984; 114/183 R; 340/620
[58] Field of Search ............... 340/602, 612, 620, 984; 116/109, 26; 114/183 R, 197, 121, 125, 360; 440/1

[56] References Cited

U.S. PATENT DOCUMENTS 4,341,178 7/1982 Price ..................... 340/605
4,542,373 9/1985 Hillock .................... 114/197
4,697,535 10/1987 Wileman, III ............ 114/183 R
4,841,282 6/1989 Reis ......................... 340/602
5,047,753 9/1991 Birchfield ................. 114/197
5,051,744 9/1991 Ewart ...................... 340/984

Primary Examiner—Jin F. Ng
Assistant Examiner—Brent A. Swarthout

[57] ABSTRACT

The boat sinking warning device is hermetically sealed box, to be permanently installed in the bilge area of a boat, to give an audio frequency or radio frequency warning if a boat is leaking. It comprises two externally exposed conductive terminals, and an electronic circuit to sense the presence of water across these terminals and thereby continually sound an audio alarm or radiate a radio-frequency signal to a remote facility.

5 Claims, 3 Drawing Sheets

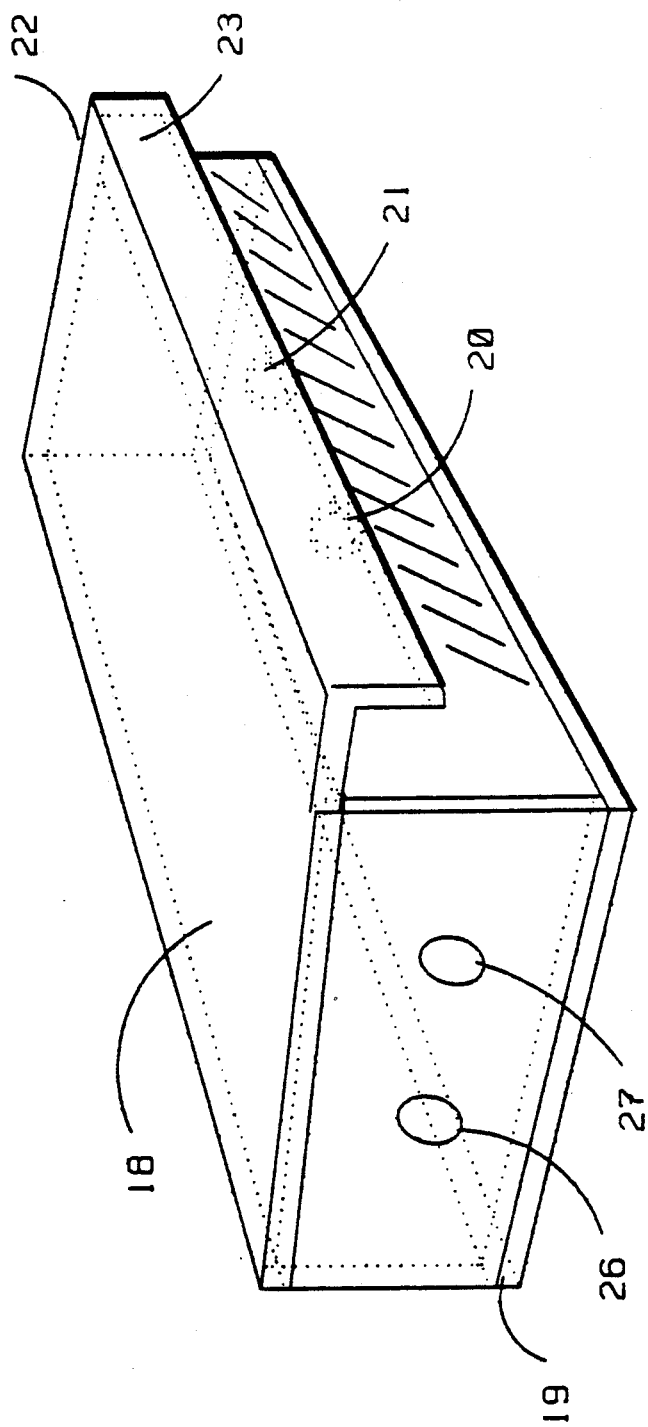

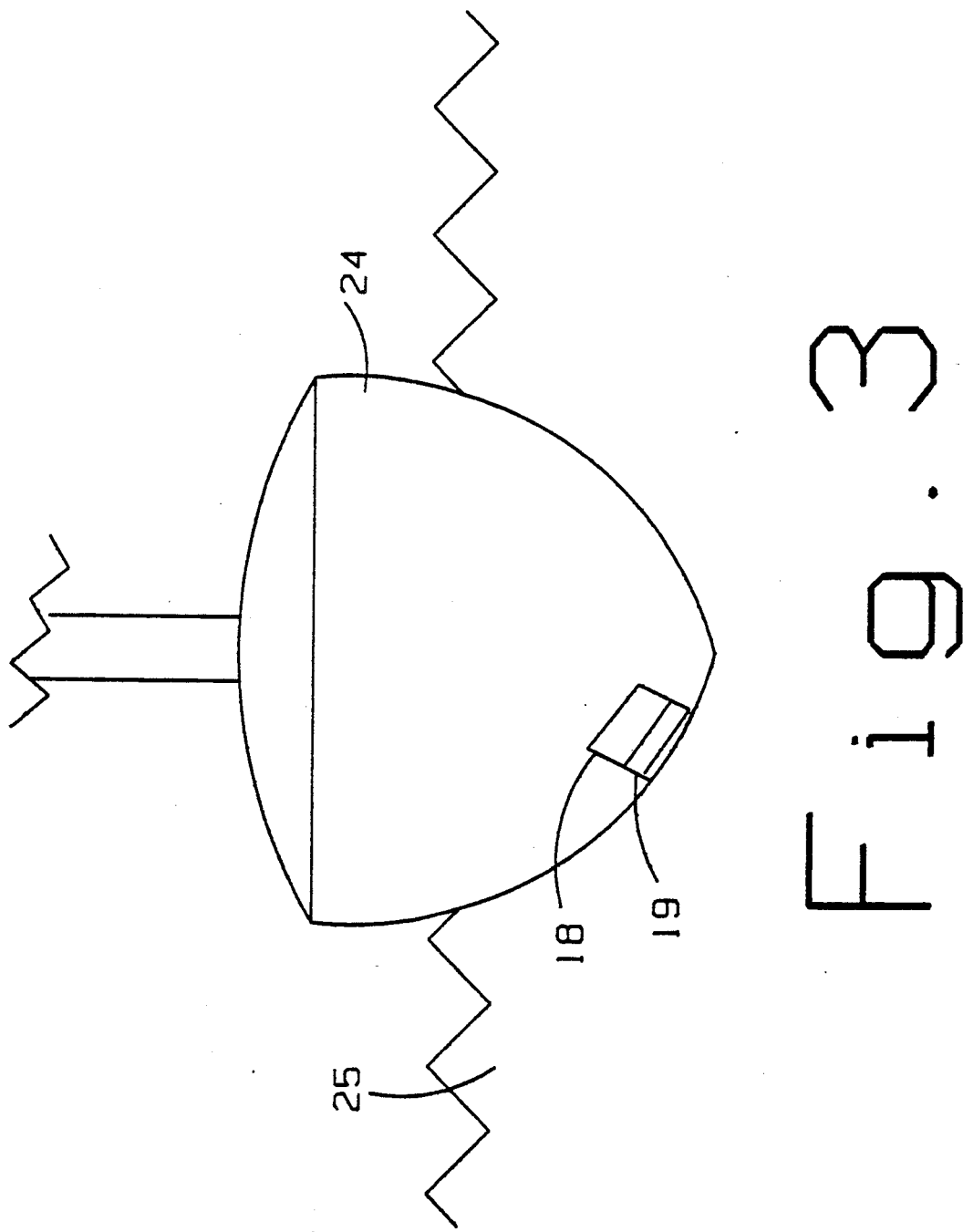

BOAT SINKING WARNING DEVICE

BACKGROUND OF THE INVENTION

Unbeknown to the owner, a boat may be slowly leaking, with the eventual possibility of sinking. Even if the boat does not sink, a slow leak is a condition demanding attention. Since the evidence of a boat leaking is often difficult to discern, the owner may not even be aware of the problem.

The earliest manifestation is a collection of water in the bilge area, just above the keel, in the lowest internal part of the boat. This area is generally not readily available to the owner, even for inspection.

SUMMARY OF THE INVENTION

The boat sinking warning device is a method of alerting the owner of the presence of a leak in the boat and possible subsequent sinkage. It is a small box that is fastened to the boat in the bilge area in the lowest internal area of the boat. The box is hermetically sealed, and comprises a clever unique electronics circuit that will detect the presence of water, and then sound an alarm, or emit a radio frequency to a distant monitoring satin, to alert the owner of the problem. The presence of water detection comprises two externally exposed conductive terminals. When water reaches the level of the terminals the resistance between the points drops markedly, and this drop in resistance is sensed by the internal circuit.

Due to the very low standby power requirements of the electronic circuitry, the battery drainage is minimal. If batteries, having low internal leakage, are used, the boat sinking warning device should give years of maintenance free service.

It should also be understood that the clever electronic circuitry disclosed here may be used for other applications where detection of a resistance and subsequent repetitive sounding of an alarm or signal transmission are required.

BRIEF DESCRIPTION OF THE DRAWINGS

FIG. 2 is an embodiment of the boat sinking warning device.

FIG. 3 shows the boat sinking warning device deployed in the bilge area of a boat.

DESCRIPTION OF THE PREFORMED EMBODIMENTS

Figure 1:
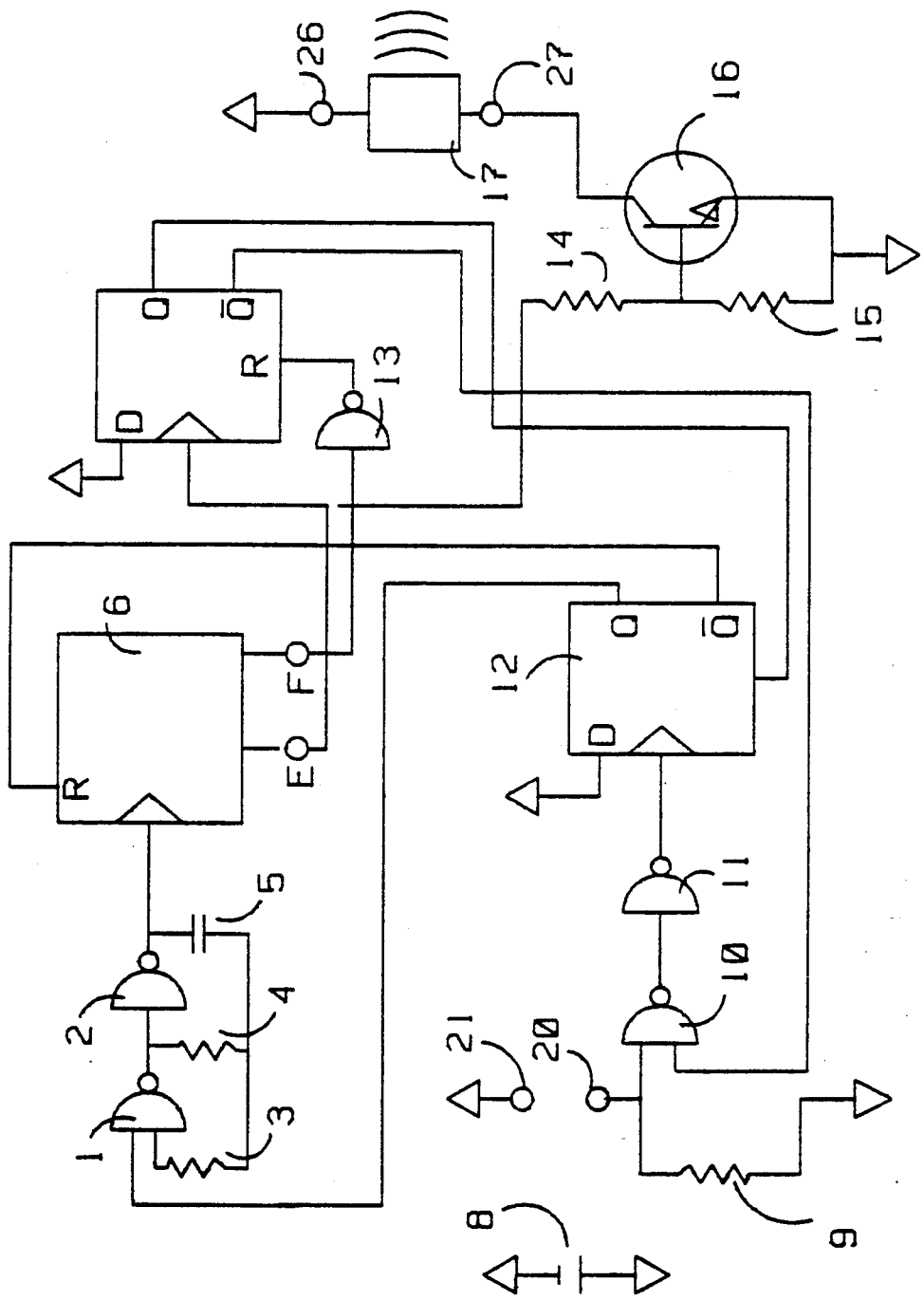
FIG. 1 is a symbolic representation of the circuitry.

In FIG. 1, when the boat is leaking, water will eventually short the externally exposed contacts 20, 21 since salt water and fresh pond water are conductive, an electronic path is formed between the exposed contacts 20, 21. This will cause input A of NAND gate 10 to go high, the output of NAND gate 11 to go high, and the clock of RS enabling flip-flop 12 to go high; this sets the RS enabling flip-flop 12, its Q output goes high, and its Qoutput goes low. This enables the oscillator 1, 2, 3, 4, 5 to start oscillating. The counter 6 starts pulsing high and low; this causes the owner transistor 16 to repetitively turn on and off and the speaker 17 to emit an audible sound.

At the end of the counter cycle, the highest order output F goes low. Shortly at this time, the rest of the RS sampling flip-flop connected to outputs from counter 6 goes low. Shortly thereafter, the lower order output E of the counter 6 goes high, and the sampling flip-flop is set, causing the Q output to go high and resetting the RS enabling flip-flop 12 goes high, and the counter 6 is reset. At this time, the higher order output F to the counter 6 goes low, and the RS sampling flip-flop connected to outputs from counter 6 is reset.

A very short time later, the condition across the externally exposed points 20, 21 is polled, through the action of input B of NAND gate 10 going low, then high. If water is still present across the externally exposed points 20, 21 indicating the continued presence of water, the timing cycle is repeated, and the speaker 17 continues to sound an alarm.

FIG. 2 shows the preferred embodiment of the boat sinking warning device. The electronics hardware is contained in a hermetically sealed box, consisting of the box portion 18, lid 19, shelf 22, and lip 23. Externally exposed points 20, 21 are protected from moisture by shelf 22, and lip 23. Remote jacks 26, 27 serve as a means for installing the speaker 16, or a parallel speaker at a remote location.

FIG. 3 depicts the boat sinking warning device 18, 19 deployed in the bilge portion of a boat 24. The boat sinking warning device may be either fastened to the hull, or a sticking substance may be used. It should also be inhered, and obvious, that the speaker 17 might be replaced by a transmitter to send the warning to a remote receiver monitor, which may take appropriate action such as: an alarm, dial a telephone number, etc.

I claim:

1. A boat sinking warning device, to be deployed permanently on the bilge area of a boat comprising:
   - a hermetically sealed box, with two externally exposed conductive terminals protruding from one of the vertical sides of said hermetically sealed box, an electrical connection from each of the two externally exposed conductive terminals on the internal side of the box of said externally exposed conductive terminals, the connections connecting the terminals to electronic circuitry within said hermetically sealed box, said electronic circuitry having means to detect a low resistance across said terminals and sound an alarm.
   - a shelf portion of said hermetically sealed box, said shelf portion comprising an extension of the top side of said hermetically sealed box for about one half inch beyond the vertical side containing said externally exposed conductive terminals, said shelf portion being in the same plane as the top side of said hermetically sealed box, said shelf portion having a length equal to the length of said top side measured along the juncture of said top side and said shelf portion,
   - a lip portion of said hermetically sealed box, said lip portion connected to the edge of said shelf portion extended beyond the vertical side containing said externally exposed conductive terminals, said lip portion having a length equal to the length of said shelf portion measured along the juncture of said shelf portion and said lip portion, said lip portion extending vertically downwards for about one half inch from said juncture,
   - means for fastening said boat sinking warning device to the bilge area of a boat.

2. The boat sinking warning device of claim 1 wherein the means to sound an alarm comprises means for transmitting a warning signal.

3. The boat sinking warning device of claim 1 wherein means to detect a low resistance across said terminals and sound an alarm comprises:

an input resistor, one side of said resistor connected to the negative side of a battery, the other side of said input resistor connected to one of said externally exposed conductive terminals and the A input of a dual input NAND gate A, the other externally exposed conductive terminal connected to the positive side of the battery, the output of said NAND gate A connected to he inputs of a dual input NAND gate B, the output of said NAND gate B connected to the clock of an RS flip-flop Z, a D input of said RS flip-flop Z connected to the positive side of said battery, a Q output of said RS flip-flop Z being connected to one input of a dual input NAND gate C, the other input of said NAND gate C being connected to one side of a resister Y, the other side of said resistor Y being connected to one side of a resistor X and one side of a timing capacitor, the other side of resistor X being connected to the output of said dual input NAND gate C, the other side of said timing capacitor being connected to the output of a dual input AND gate D, the dual input of said NAND gate D being connected to the output of said NAND gate C, the output of said NAND gate D being connected to the clock of a counter, a reset of said counter being connected to a $\overline{Q}$ output of said RS flip-flop Z, a lower order output of said counter being connected to the clock of a RS flip-flop W, a D input of said RS flip-flop W being connected to the positive terminal of said battery, a $\overline{Q}$ output of said RS flip-flop W being connected to the other input of said dual input NAND gate A, a Q output of said RS flip-flop W being connected to a reset of said RS flip-flop Z, a higher order output of said counter being connected to the inputs of a dual input NAND gate E, the output of said NAND gate E connected to a reset of said RS flip-flop W, said lower order output of said counter connected to one side of a limiting resistor, the other side of said limiting resistor connected to the base of a power transistor and one side of a bias resistor, the other side of said bias resistor being connected to the negative terminal of said battery, an emitter of said power transistor being connected to a negative terminal of said battery, a collector of said power transistor being connected to one side of a speaker, the other side of said speaker being connected to the positive terminal of said battery.

4. The boat sinking warning device of claim 3 wherein said speaker is replaced by a radio-frequency transmitter.

5. The boat sinking warning device of claim 3 wherein a radio frequency transmitter is connected across said speaker.

* * * * *